United States Patent [19]

Saari

[11] 3,863,353

[45] Feb. 4, 1975

[54] EPITROCHOIDAL SURFACE ENGAGING DEVICE

[75] Inventor: Oliver E. Saari, Niles, Ill.

[73] Assignee: Illinois Tool Works Inc., Chicago, Ill.

[22] Filed: Sept. 22, 1972

[21] Appl. No.: 291,310

Related U.S. Application Data

[63] Continuation-in-part of Ser. No. 257,835, May 30, 1972, abandoned.

[52] U.S. Cl.............. 33/174 R, 33/174 L, 33/174 P
[51] Int. Cl. .............................................. G01b 5/20
[58] Field of Search........... 33/174 R, 174 L, 174 P, 33/174 Q, 1 BB, 27 R, 27 L; 29/156.4 WL; 418/61 A

[56] References Cited
UNITED STATES PATENTS

| | | | |
|---|---|---|---|
| 2,422,034 | 6/1947 | Mustonen | 33/174 R |
| 2,621,416 | 12/1952 | Brenneke | 33/174 Q |
| 2,988,008 | 6/1961 | Wankel | 418/61 A |

FOREIGN PATENTS OR APPLICATIONS

| | | | |
|---|---|---|---|
| 25,923 | 10/1969 | Japan | 33/174 R |

Primary Examiner—Richard E. Aegerter
Assistant Examiner—Richard R. Stearns
Attorney, Agent, or Firm—Olson, Trexler, Wolters, Bushnell & Fosse, Ltd.

[57] ABSTRACT

The present invention relates generally to improvements in devices for measuring or forming with a high degree of accuracy the contour of a surface defining the cavity of a rotary type combustion engine. The device disclosed herein is particularly designed for use with rotary combustion engines incorporating a rotor presenting three or four apices and having an internal gear which meshes with and orbits about a fixed sungear whose axis is on the central axis of the engine. The seal members at the tips of the rotor apices must maintain contact with the cylinder surface having an epitrochoidal contour. The device disclosed herein includes a rotatable base for horizontally supporting a cylinder block and means for imparting rotation to said base in a given direction about a vertical axis coincident with the center of the epitrochoidal surface defining the cavity of a supported cylinder block. A surface contacting element is shiftable in the opposite direction and novel control means serves to assure positioning of said element in accurate coincidence with said epitrochoidal surface during the rotation of the engine block.

21 Claims, 14 Drawing Figures

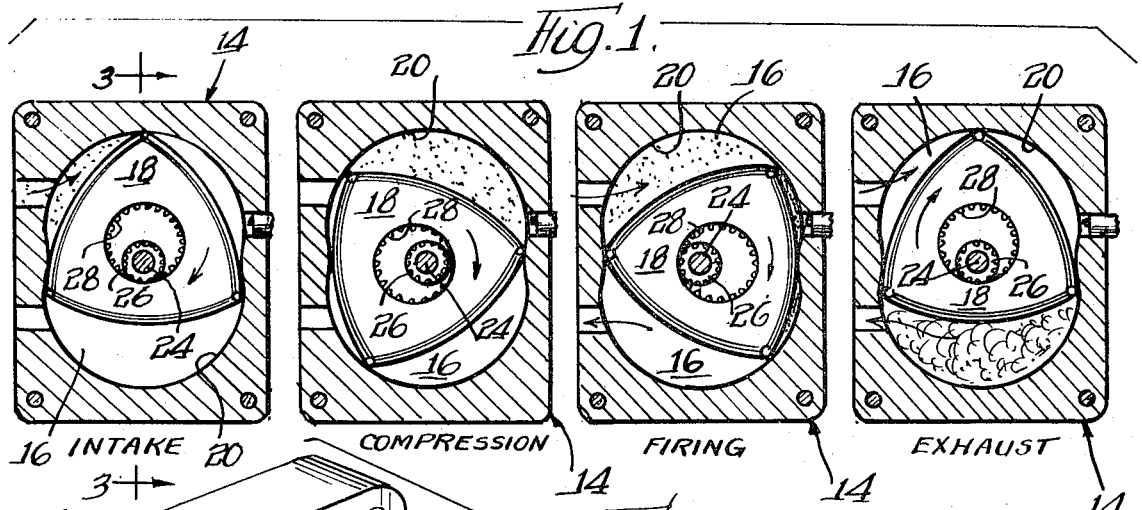
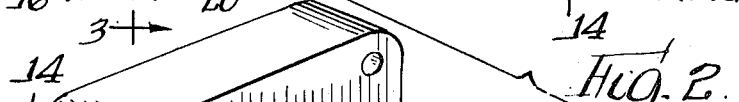
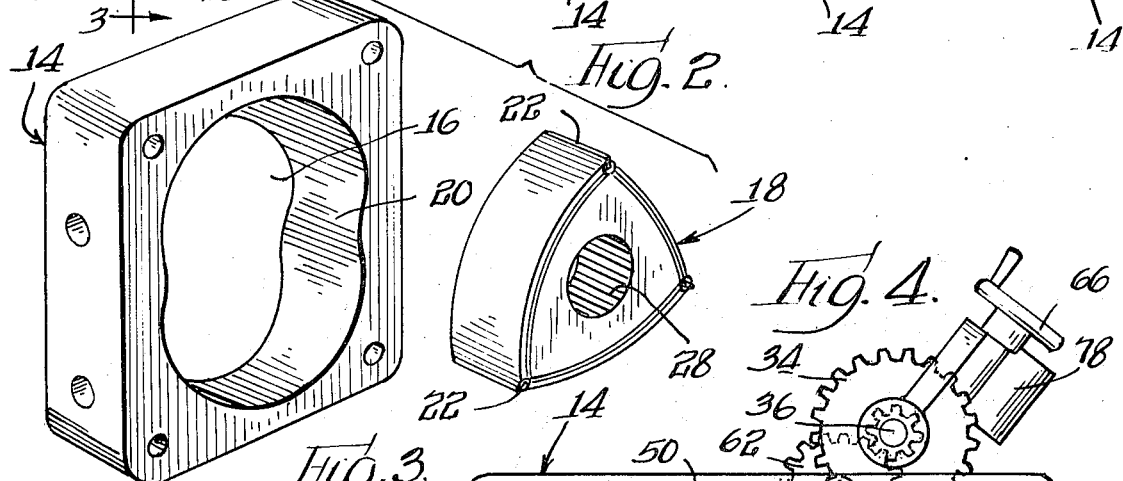
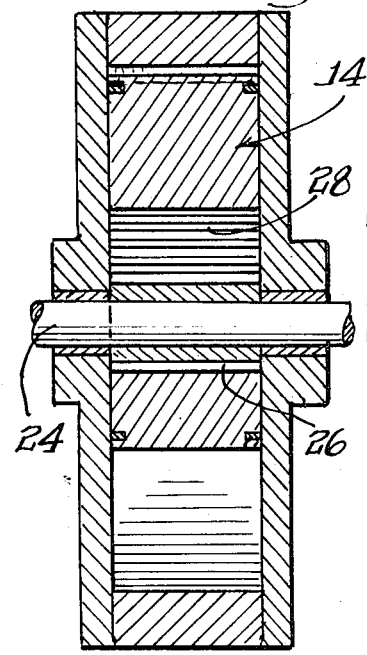
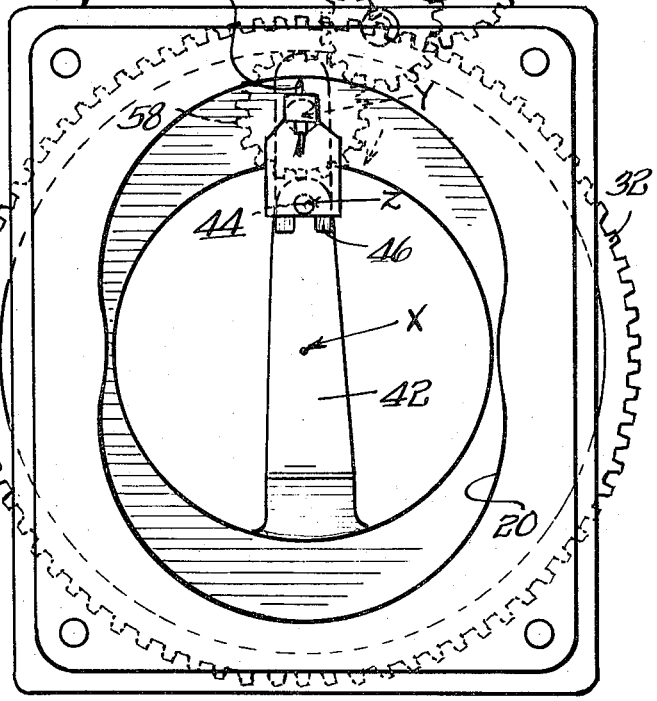

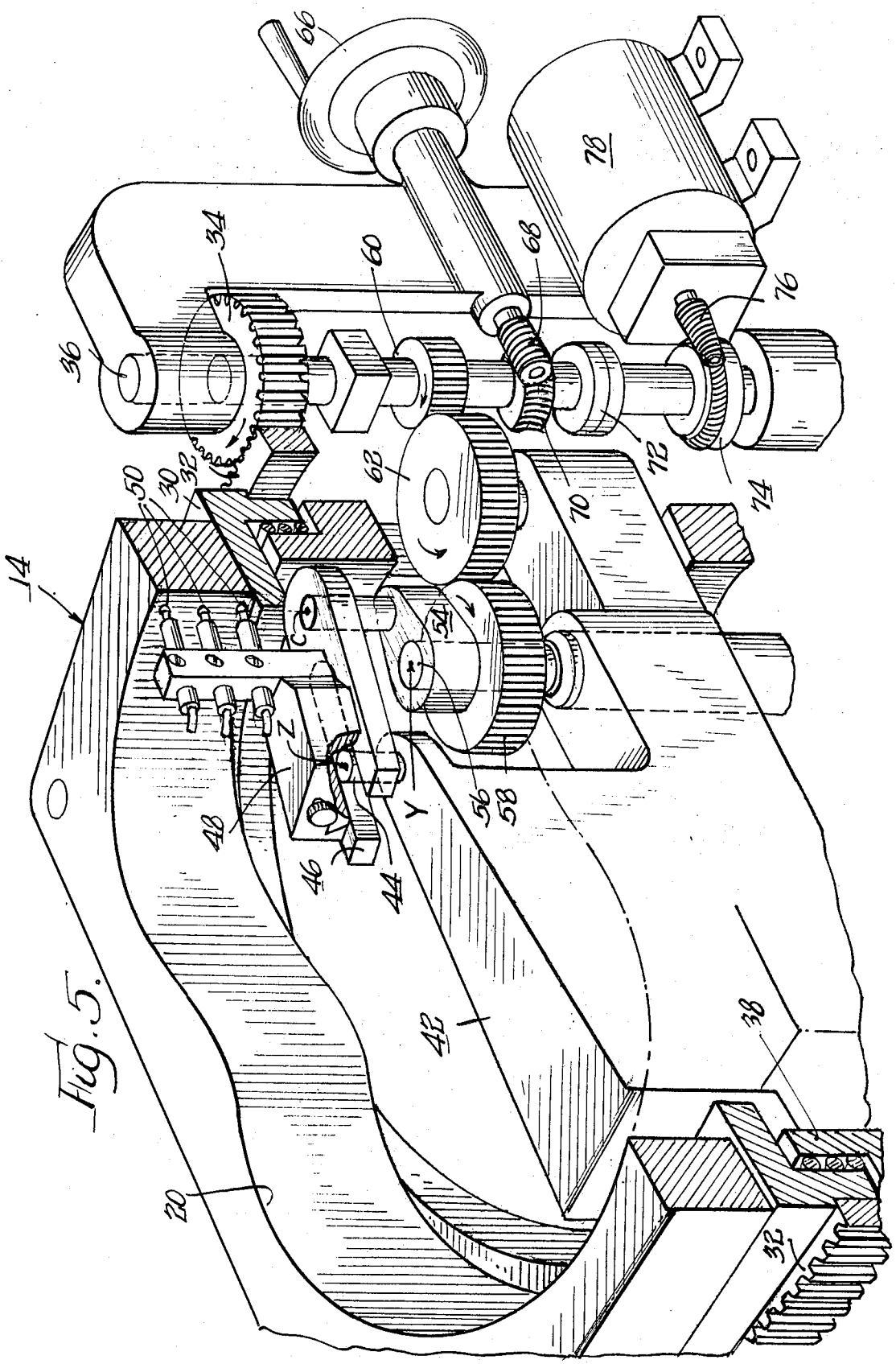

EPITROCHOIDAL SURFACE ENGAGING DEVICE

REFERENCE TO RELATED APPLICATION

This application is a continuation-in-part of application Ser. No. 257,835, filed May 30, 1972, and entitled Epitrochoidal Surface Engaging Device, and now abandoned.

SUMMARY OF THE INVENTION

The rotary type combustion engine with which the present invention is concerned consists of a rotor presenting a plurality of apices which is rotatable within the cavity of a fixed engine block. Seal members provided at the tips of each of the rotor apices must maintain contact with the surface defining the engine block cavity, and it has been found that a cylinder block cavity defined by an epitrochoidal surface makes this possible. The rotor rotates about an axis which continuously moves in an orbit in accordance with the contour of the surface which defines the engine block cavity. It will therefore be obvious that this surface contour must be formed with a high degree of precision, and one of the important objects of the present invention is to assure precision in the contour of the surface defining the cavity in the cylinder block of a rotary type engine.

It is a further object of the present invention to provide a novel means whereby a cylinder block of the type referred to above may be rotated about a vertical axis coincident with the center of the cavity thereof, and the surface contour defining said cavity may be contacted with precision during said rotation.

More specifically, the present invention contemplates novel means for measuring the accuracy of the contour of the surface defining the cylinder cavity of a rotary type combustion engine, as for example an epitrochoidal surface.

It is a further object of the present invention to provide novel and very practical control means whereby an element for contacting an epitrochoidal surface may be shifted simultaneously with the rotation of a cylinder block about the central vertical axis of the cavity thereof defined by an epitrochoidal surface in such a manner as to conform precisely with the varying degree of orbital eccentricity of said epitrochoidal surface at the points of contact therewith.

BRIEF DESCRIPTION OF THE DRAWINGS

The foregoing and other objects and advantages will be apparent from the following detailed description when considered in connection with the accompanying drawings wherein:

FIG. 1 is a semi-diagrammatic disclosure to illustrate various positions occupied by the rotor of a rotary type internal combustion engine as it revolves within the cavity of the fixed engine or cylinder block;

FIG. 2 is a perspective view of a rotor and cylinder block in separated relation;

FIG. 3 is an enlarged central sectional view of the cylinder block and rotor taken substantially along the line 3—3 of FIG. 1;

FIG. 4 is a plan view of the cylinder block of FIG. 2 mounted upon a rotatable base as contemplated by the present invention, the surface engaging or detecting device being shown in engagement with a mid-point in the epitrochoidal surface defining the cylinder block cavity;

FIG. 5 is a fragmentary perspective view illustrating one form of the device contemplated by the present invention which may be used to measure or test for accuracy the contour of the epitrochoidal surface defining the cavity in an engine or cylinder block;

DESCRIPTION OF THE PREFERRED EMBODIMENTS OF THE INVENTION

Figure 6:
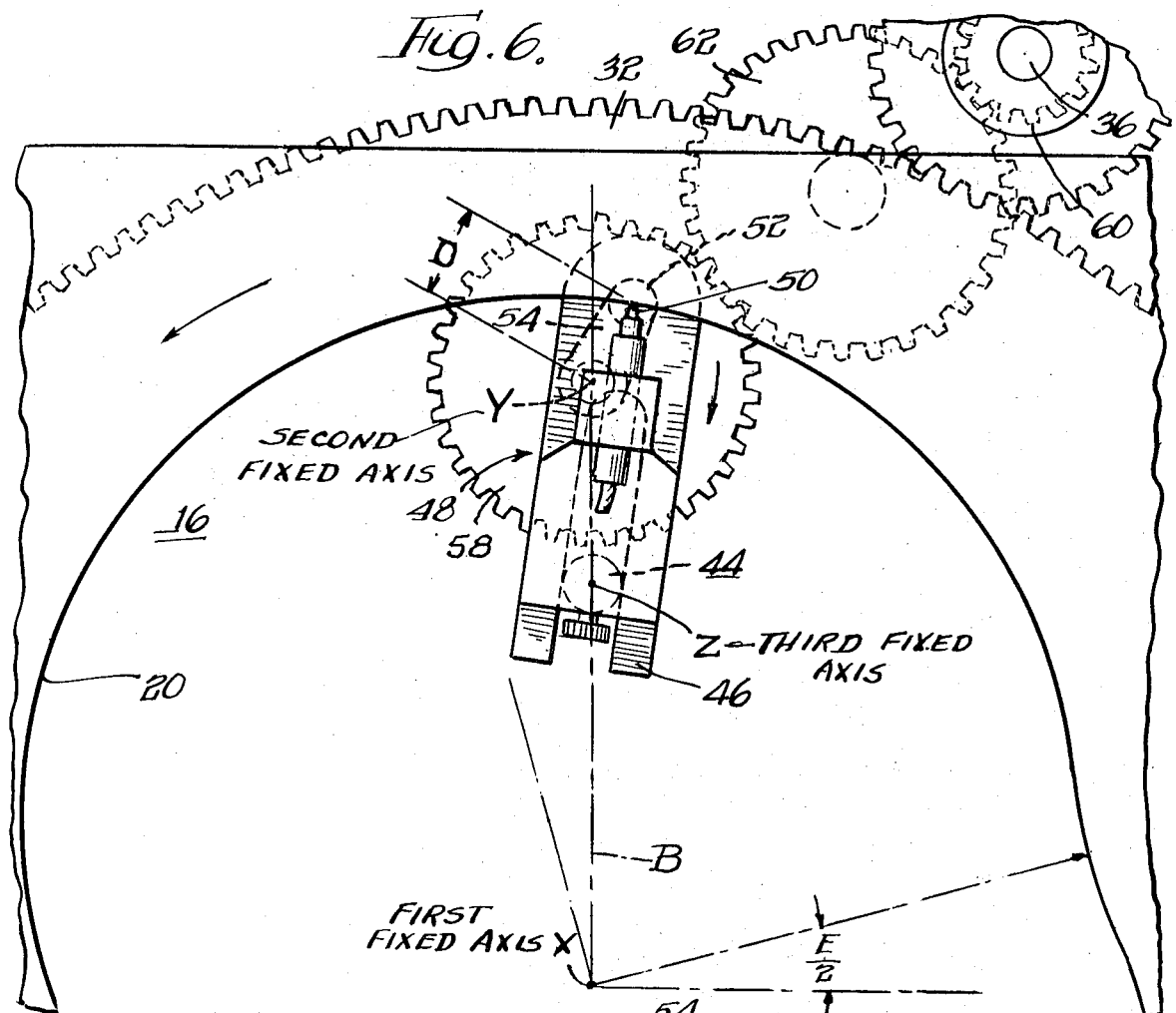
FIG. 6 is a semi-diagrammatic fragmentary plan view of the upper portion of the device as illustrated in FIG. 4, the supported engine block having been slightly rotated in a counter-clockwise direction at a given speed, during which period the crank arm associated with the surface detector has been rotated in a clockwise direction at twice the aforesaid speed.
Figure 7:
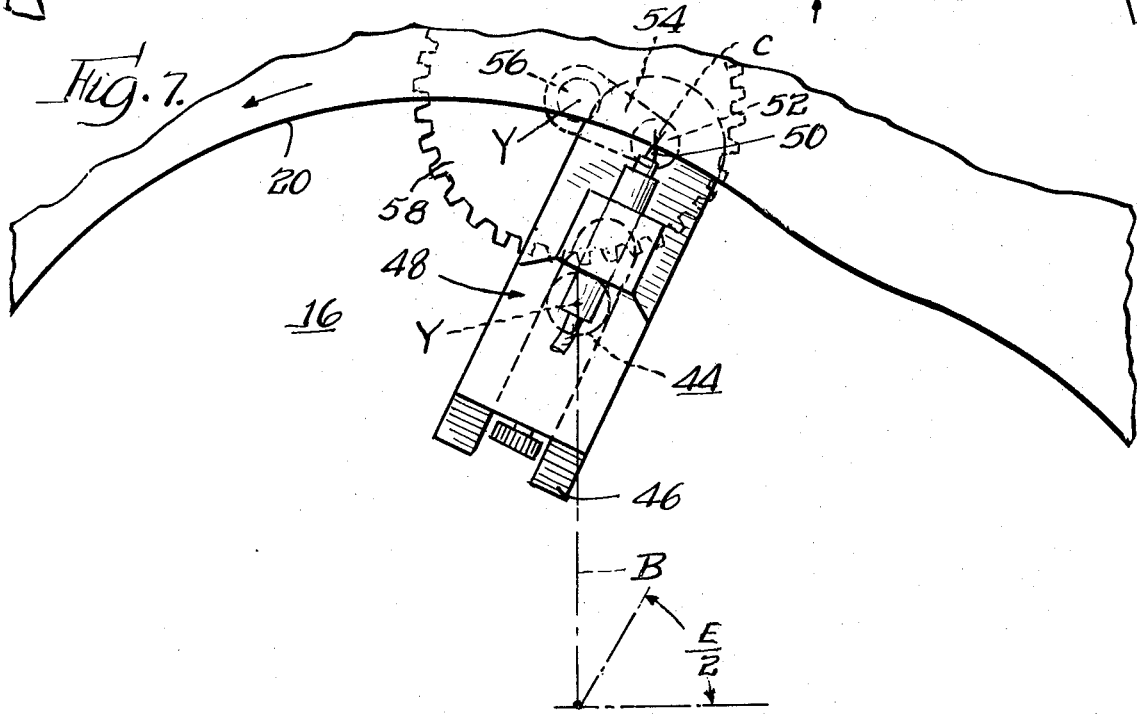
FIG. 7 is a similar but fragmentary view of FIG. 6 illustrating the relative positions of the detector member and cylinder block cavity as said block has been rotated further in a counter-clockwise direction.
Figure 8:
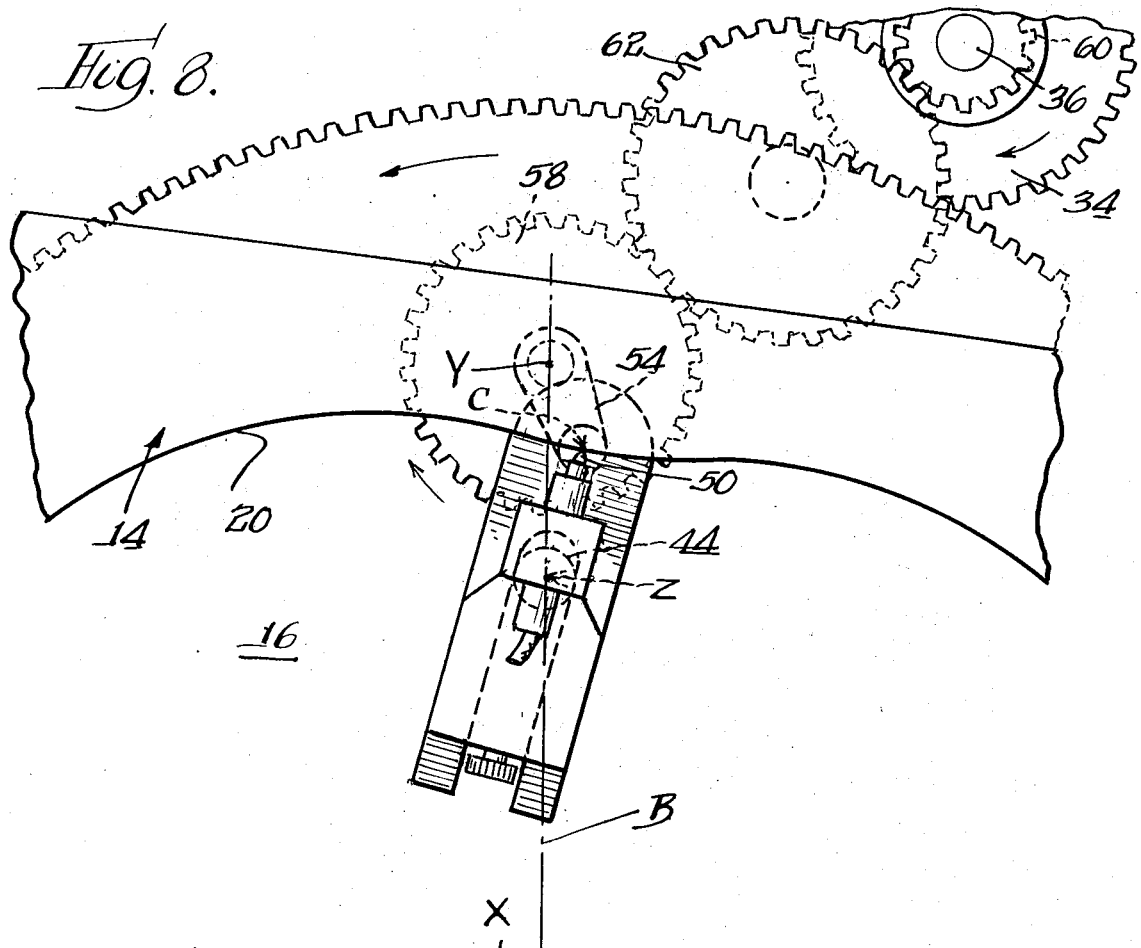
FIG. 8 is a view similar to FIG. 6 disclosing the cylinder block after having been rotated in a counter-clockwise direction through slightly less than 90°.
Figure 9:
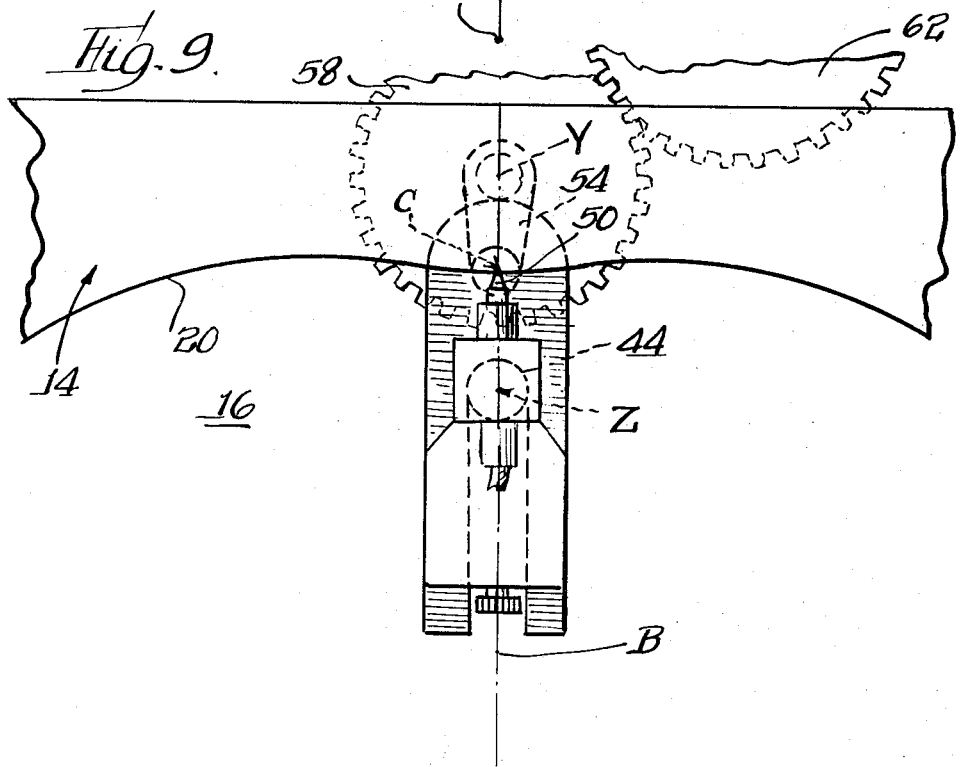
FIG. 9 diagrammatically illustrates the positions occupied by the surface defining the cylinder block cavity and the detector element after the cylinder block has been rotated through 90° in a counter-clockwise direction and the crank arm has been rotated in a clockwise direction through 180°.
Figure 10:
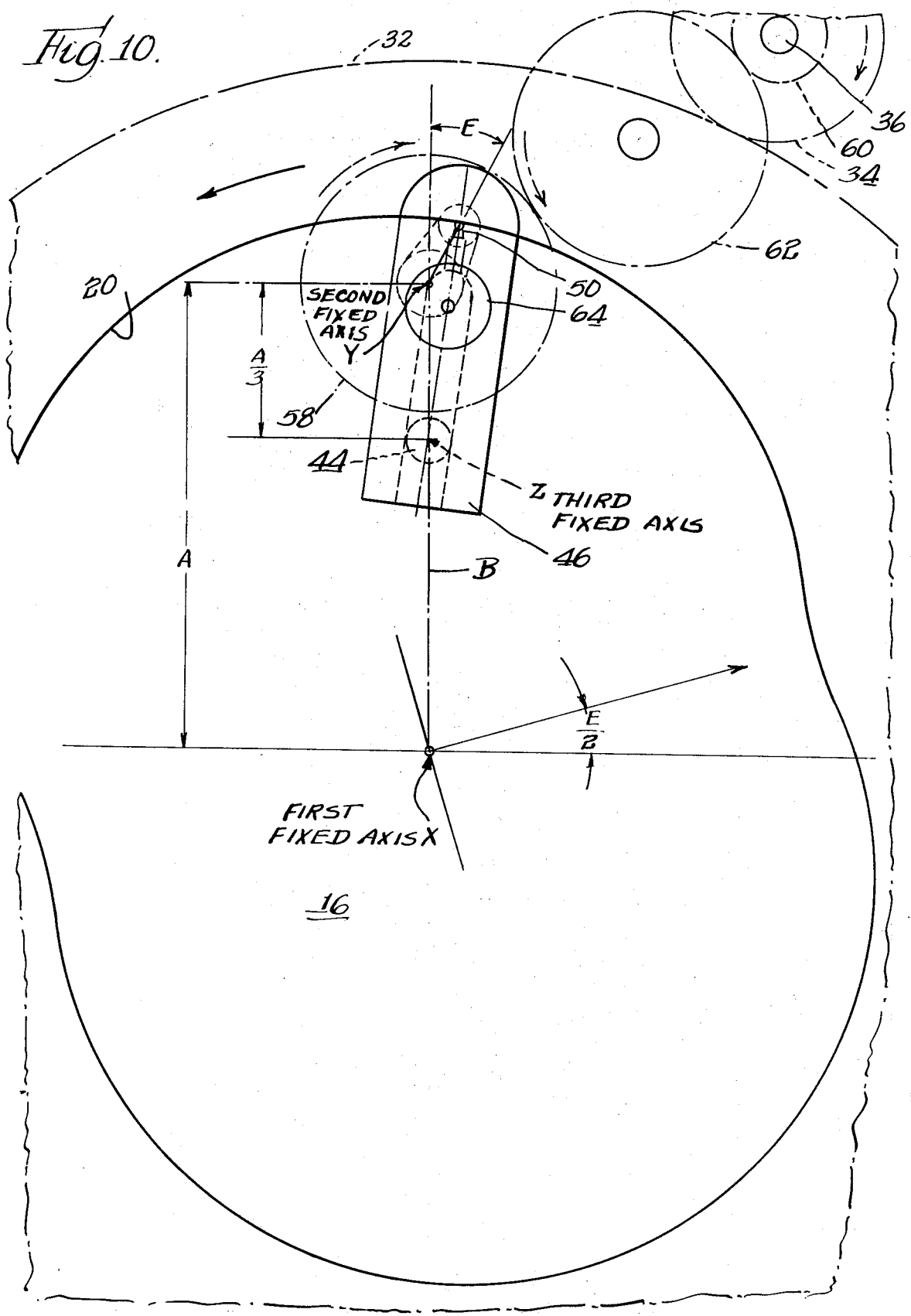
FIG. 10 is a view similar to FIG. 6 illustrating substantially the entire epitrochoidal surface defining the engine block cavity.

Reference is now made to the drawings in detail wherein like numerals have been employed to designate similar parts throughout the various views. Referring to FIG. 2, it will be seen that an engine block 14 is provided with a cavity 16 to accommodate a three-apex rotor 18. Particular attention is directed to the contour of the surface 20 with which seal members 22 associated with the apices of the rotor 18 are to be in continuous contact. In order to maintain such continuous contact of the seal members 22 with the surface 20 it is essential that said surface present a contour which is related to a family of curves commonly referred to as epitrochoids. In the following description as well as in the claims the contour of the surface 20 will be referred to as epitrochoidal. With a view of more clearly explaining the importance of the abovementioned epitrochoidal surface which defines the cavity 16, a series of views are shown in FIG. 1 which illustrate the rotary orbital movement of the rotor with the three apex seals thereof maintaining contact with the surface 20. The shaft driven by the rotor 18 is indicated by the numeral 24 and carries a gear 26 driven by an internal gear 28 centrally positioned with respect to and forming a part of the rotor 18. Thus, as the rotor 18 occupies the various positions of rotation illustrated in FIG. 1, the center of the rotor follows an orbital path in accordance with the epitrochoidal surface 20 defining the cavity 16.

One of the broad purposes of the present invention is to provide a unique and practical device which will enable the cylinder block 14 to be rotated about a vertical axis coincident with the center of the cylinder block cavity while an element for contacting the epitrochoidal surface 20 is shifted in timed relation with the rotation of the cylinder block, so as to assure the positioning of said element in accurate coincidence with said epitrochoidal surface. For the purpose of illustrating one practical application of the present invention, a machine or mechanism will now be described, the various elements of which are best shown in FIG. 5.

FIG. 5 discloses the cylinder block 14 supported upon and rotated by an annular base member 30. The cylinder block 14 rests upon the upper surface of the annular base member 30, said base member being encircled by a ring gear 32 which is driven by a gear 34 mounted upon a drive shaft 36. The base 30 and ring gear 32 carried thereby are rotated as a unit in a counter-clockwise direction as viewed in plan and are supported by an annular frame structure 38. It will be seen that the axis of rotation of the annular base 30 is designated by the letter X in FIGS. 4, 6, 8, 10 and 12. This fixed vertical axis of rotation X must be coincident with the center of the cylinder block cavity 16.

It will be noted that the fixed frame 38 incorporates a horizontally disposed elongate column or arm 42, the extremity of which serves to support a vertical pin or fixed guide member 44. The guide member 44 is slidably engaged by a slotted arm member 46 the upper surface of which supports surface detecting mechanism designated generally by the numeral 48. The detecting mechanism 48 includes a plurality of vertically separated feelers 50 designed to engage and thereby detect the epitrochoidal accuracy of the surface 20. The slotted member 46 which supports the feeler mechanism 48 is pivotally coupled through the agency of a vertical pin 52, to the free extremity of a crank arm 54. The crank arm 54 is connected with a rotatable shaft 56, which is coupled with a drive gear 58 rotatable in a clockwise direction, as viewed in plan. The gear 58 is driven from a pinion or gear 60 on the drive shaft 36 through an idler gear 62.

At this point in the description it should be understood that the aforesaid gearing arrangement serves to rotate the crank arm 54 about a fixed axis Y of the shaft 56 at twice the speed of rotation of the counter-clockwise rotation of the cylinder block 14 about the fixed axis X. The fixed axis Y will hereinafter be referred to as the second fixed axis of rotation. The axis of the vertical guide pin 44 is indicated by the letter Z, and will hereinafter be referred to as the third fixed axis. The distance between the first fixed axis X and the second fixed axis Y is designated by the letter A, FIG. 6. The distance between the second fixed axis Y and the third fixed axis Z as indicated in FIG. 6 is one-third of the distance A, and the distance between the first fixed axis X and the third fixed axis Z is two-thirds of the distance A. It is important to note that the aforesaid fixed vertical axes X, Y and Z are coincident with a vertical plane indicated by the line B, in FIGS. 6 to 11, inclusive. The radial distance between the vertical axis of the pivotal connector pin 52, indicated by the letter C, and the fixed axis Y of the shaft 56 is equal to the maximum orbital eccentricity of the epitrochoidal surface 20 indicated by the letter D. It should also be understood that the vertical axix C of the crank pin 52 is at all times in precise axial alignment with the work-engaging restricted surface areas of the feelers or detectors 50 positioned thereabove. Hence, any lateral movement or shifting of the axis C of the pin 52 during the simultaneous counter-clockwise rotation of the cylinder block 14 will result in a corresponding movement of said feelers 50. This corresponding movement of the axially aligned crank pin and feelers may best be appreciated by referring to the diagrammatic disclosures in FIGS. 11 and 12.

Figure 11:
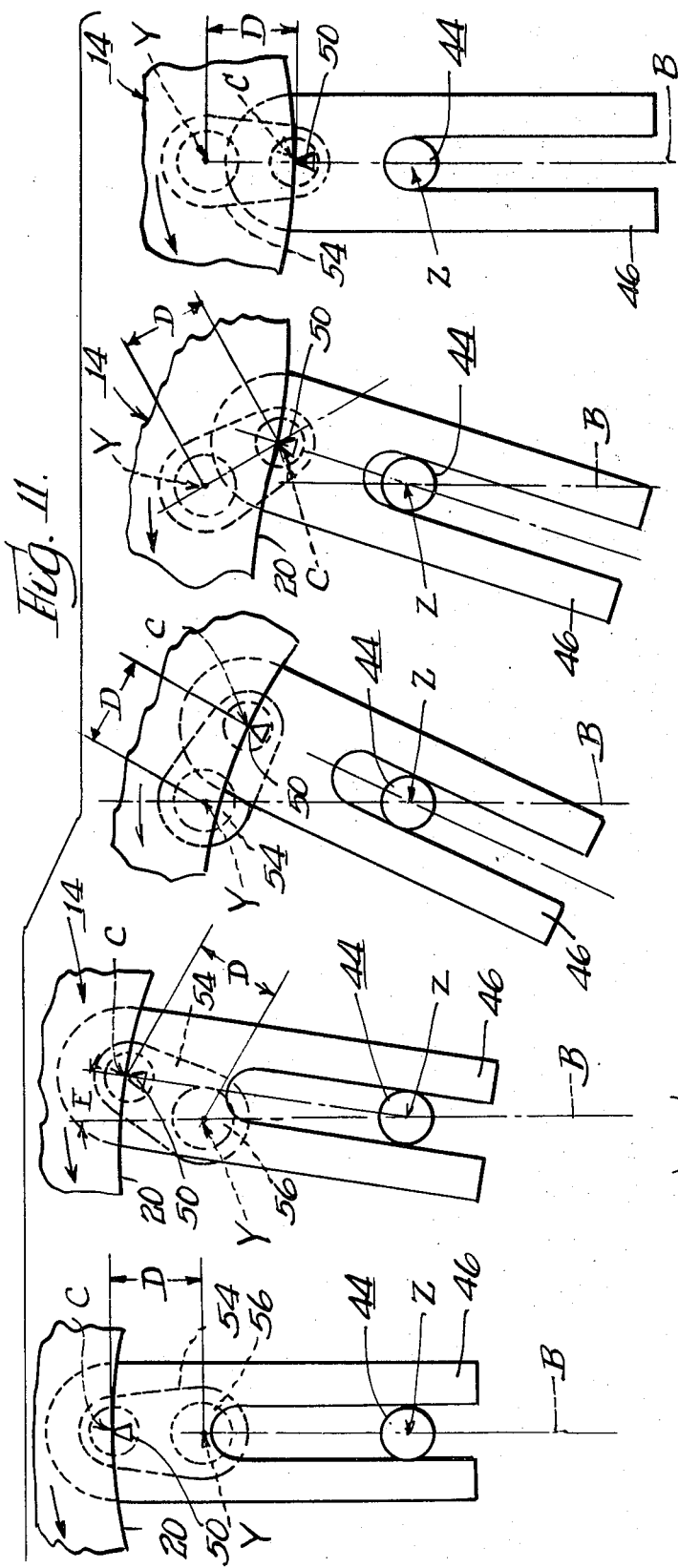
FIG. 11 is a diagrammatic representation of a series of relative positions occupied by the crank arm and the slotted feeler or work contact support means as said crank means is rotated through 180° about its fixed axis of rotation.
Figure 12:
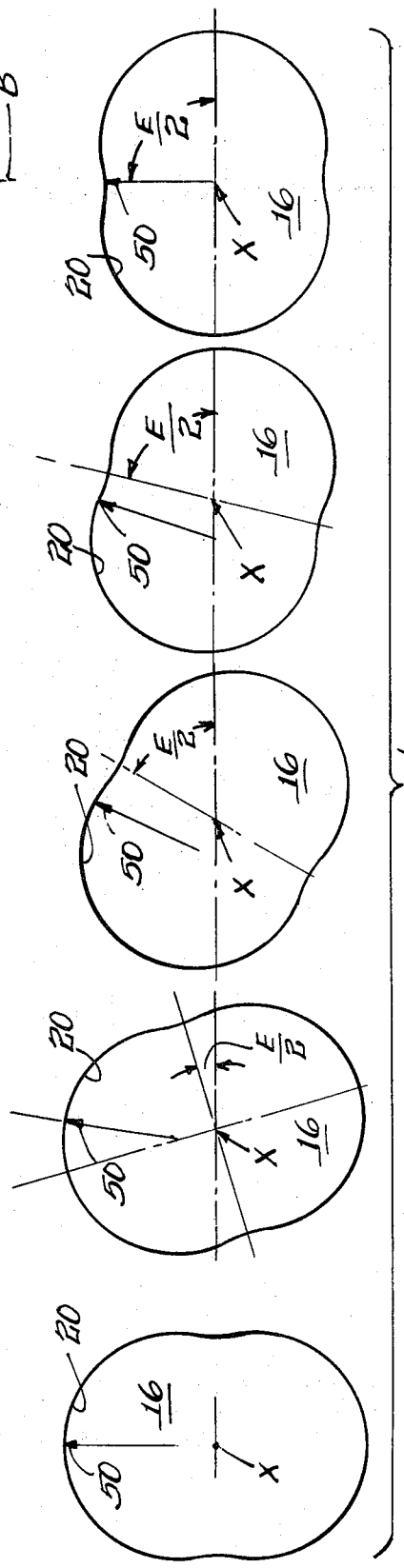
FIG. 12 discloses a series of positions of rotation of the cylinder block cavity corresponding with the series of positions of the crank arm illustrated in FIG. 11.

FIG. 11 represents a series of disclosures which when viewed in sequence from left to right illustrate the relative positions of the crank arm 54, the slotted detector support member 46 and the point of contact with the surface 20. FIG. 12 diagrammatically illustrates the position of the surface 20 with respect to the point of contact therewith by the detectors or feelers 50. It will be observed from these views that as the crank arm 54 rotates about the second fixed axis Y in a clockwise direction and the engine block 14 rotates in a counter-clockwise direction at half the speed of rotation of the crank arm, the horizontal axis of said feeler member is always normal to the tangent at the point of contact thereof with said epitrochoidal surface 20. Obviously the tip of each feeler member presents a very restricted area of contact with the surface 20. The degree of rotary movement of the crank arm 54 is indicated by the letter E and the corresponding degree of counter-clockwise rotation of the cylinder block is indicated as E/2 It has been geometrically demonstrated by applicant that if the above described structure is employed, as for example to test the accuracy of the epitrochoidal surface 20, the tip of a feeler member 50 will continuously occupy a position which is coincident with an accurately formed epitrochoidal surface. Any variation in the surface 20 from the true epitrochoidal contour is detected by the work-engaging feeler member and the degree of such variation would be reflected on a suitable dial 64, FIG. 10, which forms a part of the mechanism designated generally by the numeral 48.

Obviously, the present invention contemplates the adaptation of the above described control mechanism for use with surface contacting elements other than feeler members. In other words, it should be understood that mechanism constructed in accordance with the teachings of the present invention may be used to maintain the restricted surface-engaging portion of a tool member, as for example the periphery of a rotary grinding wheel, in a position corresponding with the above described position of the feeler member 50. Thus, the work-detecting mechanism 48 could be supplanted by other work contacting means without departing from the spirit and scope of the present invention.

Rotation may be imparted to the vertical shaft 36 through the agency of a suitable hand-operated wheel 66, FIG. 5, which is coupled with said shaft through the agency of a worm member 68 meshing with the worm gear 70. A suitable clutch mechanism 72 serves to control the connection of the shaft 36 with an electric motor 78 by suitable gearing 74 and 76. The above mentioned distance A is the radial distance from the center of the rotor 18 to the center points of the seal members 22, in other words the distance from the center of the rotor to the epitrochoidal surface 20.

Figure 13:
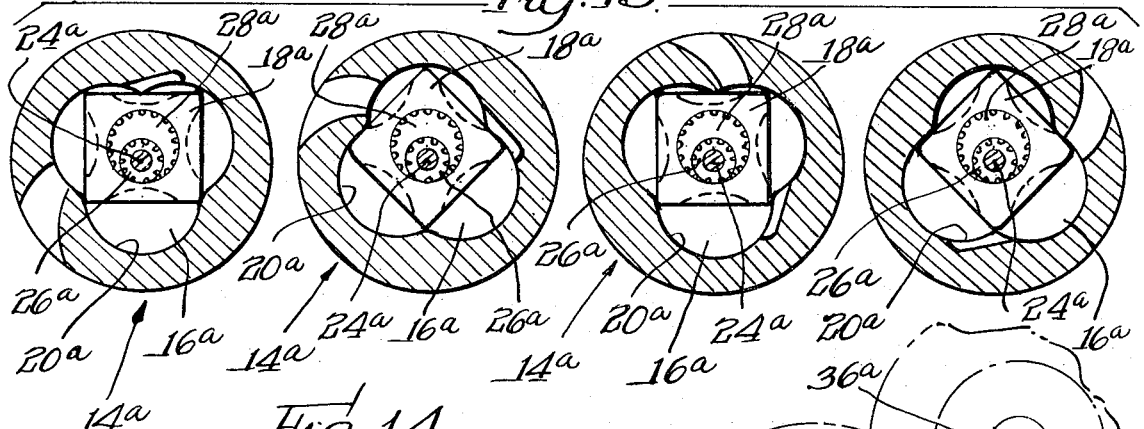
FIG. 13 is a semi-diagrammatic disclosure, similar to FIG. 1, to illustrate various positions occupied by a rotor having four apices as it revolves within a complementary fixed engine cylinder block.
Figure 14:
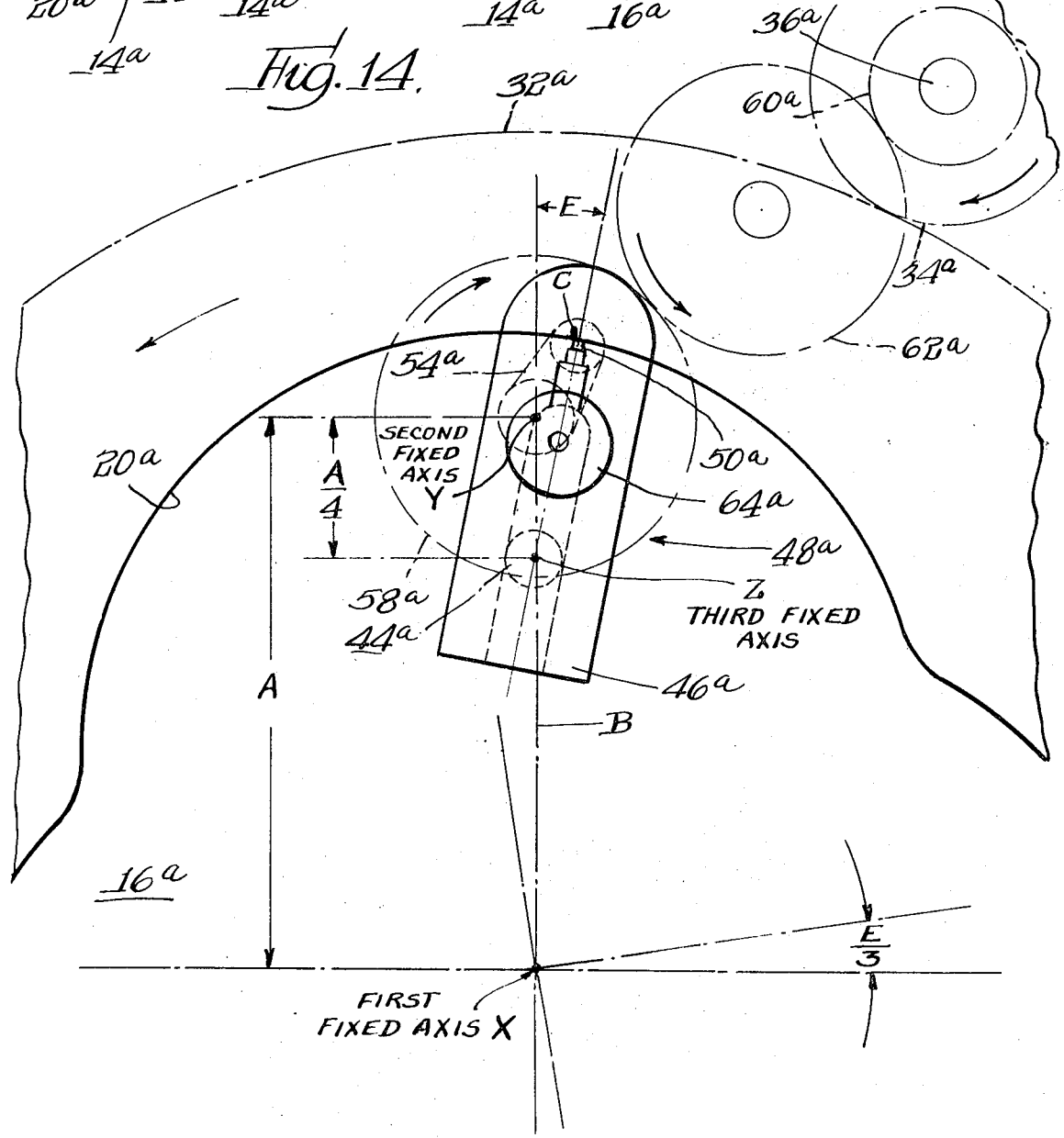
FIG. 14 is a semi-diagrammatic disclosure corresponding generally with the upper half of FIG. 10, and illustrating the application of the present invention to an engine cylinder designed to accommodate a rotor of substantially square cross-section presenting four apices.

In FIGS. 13 and 14 the application of the present invention to a rotary type engine employing a rotor having four apices, as distinguished from the previously described three-apex rotor, is shown. The engine illustrated in FIG. 13 is designated generally by the numeral 14a and is provided with a cavity 16a of generally three-leaf clover shape defining three lobes. The cavity 16a accommodates a four-apex rotor 18a. Each of the four apices of the rotor 18a are provided with seal members of the type previously described (see FIG. 2). Each of the seal members carried by the four apices of the rotor 18a are in continuous contact with a surface 20a defining the three-lobed cavity 16a. The surface 20a like the previously described surface 20 is epitrochoidal in contour. A shaft driven by the rotor 18a is designated by the numeral 24a and carries a gear 26a driven by an internal gear 28a, centrally positioned with respect to and forming a part of the rotor 18a.

In FIG. 14 a detecting mechanism designated generally by the numeral 48a corresponds structurally in every respect with the previously described detecting mechanism 48. Hence, it will not be necessary to describe in detail all of the elements which comprise the detecting mechanism 48a other than to mention that certain elements of this mechanism and parts associated therewith are indicated by numerals corresponding with the numerals previously employed in FIGS. 1 to 12, inclusive, but bearing the suffix a. A crank arm 54a corresponding with the crank arm 54 rotates in a clockwise direction, as viewed in FIG. 14, and a ring gear 32a corresponding with the previously described gear 32 causes the engine cylinder or block to be rotated in the opposite or counter-clockwise direction. As previously emphasized, the relative speeds of rotation of the supported engine block in one direction about a first fixed axis X and the crank arm 54a in the opposite direction about the second fixed axis Y is critical. The detecting mechanism 48 is used in association with the engine employing a three-apex rotor 18, and the arm 54 rotates about the second fixed axis Y with twice the speed of rotation of the supported engine block about the first fixed axis X. However, when the rotary engine cylinder is provided with a cavity 16a defined by epitrochoidal surfaces designed to accommodate the four-apex type rotor 18a, the speed of rotation of the crank arm 54a about the second fixed axis Y is three times the speed of rotation of the supported engine block about the first fixed axis X. This is illustrated in FIG. 14, wherein a given degree of rotation of the arm 14a about the second fixed axis Y is indicated by the letter "E," whereas the corresponding angular displacement of the cylinder block is indicated by E/3.

In the previously described surface detecting operation relating to an engine employing a rotor having three apices, the distance between the second fixed axis Y and the third fixed axis Z is one-third of the distance A, the distance A being the distance between the first fixed axis X and the second fixed axis Y. It will be noted in FIG. 14, that the distance between said fixed axes Y and Z is one-fourth of the distance A.

Assuming, for example, that N designates the number of apices in the rotor, and that there are N−1 complementary epitrochoidal lobes in the engine block, then the relative speeds of rotation, and the distance between the second fixed axis Y and the third fixed axis Z may be defined as follows:

A. Ratio of crank speed of rotation to engine block speed of rotation equals N−1/1. Applying this to the three-apex rotor, the ratio of crank speed of rotation to engine speed of rotation equals 3−1/1, or 2. Thus, the rotative speed of the arm 54 about the second fixed axis Y is twice the rotative speed of the supported engine block about the first fixed axis X.

B. The distance between the second fixed axis Y and the third fixed axix Z equals A/N. Applying this to the three apex rotor, the distance between the second fixed axis Y and the third fixed axis Z equals A/3 or one-third of the distance A.

Applying the foregoing analysis to the rotor having four apices, it will be found that the gear ratio equals 3, or in other words the arm 54a rotates about the second fixed axis Y with three times the speed of rotation of the supported engine block 18a about the first fixed axis X; and that the distance between the second fixed axis Y and the third fixed axis Z is one-fourth of the distance A.

It will be apparent from the foregoing description that the present invention contemplates an improved practical device for engaging or measuring the epitrochoidal surface defining the cavity in the cylinder block of a rotary type engine. The cylinder block and supporting base are rotatable about the common vertical fixed axis X heretofore referred to as the first fixed axis. The second fixed axis Y spaced a predetermined distance A from the axis X is coincident with the axis about which the crank arm 54 rotates. As previously pointed out, it is important that the horizontal distance between the axis Y and the axis C is equal to the maximum degree of orbital eccentricity of the epitrochoidal surfaces 20 and 20a. It is also important that the third fixed axis Z occupy a position spaced radially from the axis Y a predetermined fractional distance of the distance A. The coaction between the slotted supporting means 46–46a and the fixed pin 44–44a respectively, during the rotation of the crank means or arms 54–54a results in the accurate positioning of the contact members or feelers 50–50a with the epitrochoidal surface 20–20a during the counter-clockwise rotation of the cylinder block and the clockwise rotation of the crank arm. While the foregoing description is directed to the positioning of the contact members during a 90° rotation of the cylinder block and a 180° rotation of the crank arm, it will be understood that as one complete rotation is experienced by the cylinder block and two complete rotations are experienced by the crank arm, the entire epitrochoidal surface will have been contacted. During each 90° rotation of the cylinder block the work-engaging elements or feelers will have experienced a movement equal to the degree of eccentricity of one-fourth of the total extent of the epitrochoidal surface 20 of FIGS. 1 to 12, inclusive, defining the cavity 16, and one-sixth of the total extent of the epitrochoidal surface defined by the cavity 16a in FIGS. 13 and 14. It will be obvious that during each complete rotation of the cylinder block the tips of the contact elements 50 as shown in FIGS. 1 to 12, inclusive, will be subjected to four repetitions of the above described cycle of movement. Likewise, during each complete rotation of the cylinder block, as illustrated in FIGS. 13 and 14, the contacting apices or lobes of the rotor 18a will be subjected to six repetitions of said cycle. During each of the four to six cycles the tips or work-engaging portions of the contact elements will experience an orbital movement having an eccentricity equal to the distance D, namely the radial distance between the shiftable axis C and the second fixed axis Y.

While a specific mechanism is disclosed herein for rotating an engine block having a cavity defined by an epitrochoidal surface in combination with novel means for detecting the contour accuracy of said surface, the present invention contemplates other structural features and modifications within the spirit and scope of the claims appended hereto.

I claim:

1. A device for engaging an epitrochoidal surface which defines the cavity in the cylinder block of a rotary type engine, including rotatable base means having a first fixed axis of rotation and having a surface disposed normal to said axis for supporting an engine cylinder block with the center of the epitrochoidal surface thereof coincident with the axis of rotation of said base means, means rotatable about a second fixed axis spaced laterally a predetermined distance from and parallel to said first fixed axis, work engaging means having a restricted surface area for engaging the epitrochoidal surface of a supported cylinder block, means supporting said work engaging means, pivot means coupling said supporting means with said means rotatable about said second fixed axis and having an axis spaced laterally from and parallel to said second fixed axis, the axis of said pivot means being coincident with the restricted surface area of said work engaging means, the distance between said second fixed axis and the axis of said pivot means being equal to the maximum degree of orbital eccentricity of the epitrochoidal surface of a supported cylinder block, fixed guide means providing a third fixed axis and cooperatively disposed with respect to said work engaging supporting means, said first, second and third fixed axes being located in a common plane, the distance between the axes of said second and third fixed axes being a predetermined fraction of the distance between said first and second fixed axes, means cooperating with said fixed guide means and said supporting means for maintaining said third fixed axis and the points of contact of said work engaging means with the epitrochoidal surface of a supported engine block in a common plane which is normal to a line tangent to said epitrochoidal surface at each point of contact, means for imparting rotation in a given direction to said base means at a given speed, and means for simultaneously imparting movement to said rotatable means in the opposite direction at a predetermined speed of rotation greater than the speed of rotation of said base means.

2. A device for engaging an epitrochoidal surface defining the cavity of the cylinder block of a rotary type engine as set forth in claim 1 wherein the means rotatable about said second fixed axis comprises rotatably driven crank means.

3. A device for engaging an epitrochoidal surface defining the cavity of the cylinder block of a rotary type engine as set forth in claim 1 wherein the means supporting the work engaging means is provided with a longitudinal slot for accommodating said fixed guide means.

4. A device for engaging an epitrochoidal surface defining the cavity in the cylinder block of a rotary type engine as set forth in claim 1 wherein a pin member serves as said pivot means and extends between the supporting means for the work engaging means and the means rotatable about said second fixed axis.

5. A device for engaging an epitrochoidal surface defining the cavity of the cylinder block of a rotary type engine as set forth in claim 1 wherein said rotatable base means includes annular gear means movable as a unit therewith.

6. A device for engaging an epitrochoidal surface defining the cavity of the cylinder block of a rotary type engine as set forth in claim 1 wherein fixed frame means is provided for rotatably supporting said base means.

7. A device for engaging an epitrochoidal surface defining the cavity of the cylinder block of a rotary type engine as set forth in claim 1 wherein the predetermined distance between said first fixed axis and said second fixed axis is equal to the radius from the center of the rotor to be accommodated by said cavity to the point of engagement of said rotor with said epitrochoidal surface.

8. A device for engaging an epitrochoidal surface defining the cavity of the cylinder block of a rotary type engine as set forth in claim 1 wherein the means for imparting rotation to said base means in a given direction and said means for imparting rotation in an opposite direction to the means rotatable about said second fixed axis comprises a gear mechanism.

9. A device for engaging an epitrochoidal surface defining the cavity in the cylinder block of a rotary type engine as set forth in claim 1 wherein said means for engaging the epitrochoidal surface of a supported cylinder block comprises feeler members for detecting the accuracy of the contour of said epitrochoidal surface.

10. A device for engaging the epitrochoidal surface defining the cavity of the cylinder block of a rotary type engine as set forth in claim 1 wherein the distance between said second and third fixed axes is one-third of the distance between said first and second fixed axes.

11. A device for engaging an epitrochoidal surface defining the cavity of the cylinder block of a rotary type engine as set forth in claim 10 wherein the rotative speed of said means rotatable about said second fixed axis is equal to twice the speed of rotation of said base means about said first fixed axis.

12. A device for engaging an epitrochoidal surface defining the cavity of the cylinder block of a rotary type engine as set forth in claim 1 wherein the distance between said second and third fixed axes is one-fourth of the distance between said first and second fixed axes.

13. A device for engaging an epitrochoidal surface defining the cavity of the cylinder block of a rotary type engine as set forth in claim 12 wherein the speed of rotation of said means rotatable about said second fixed axis is three times the speed of rotation of said base means about said first fixed axis.

14. A device for engaging an epitrochoidal surface defining the cavity of a cylinder block of a rotary type engine as set forth in claim 1 wherein said first, second and third fixed axes extend substantially vertical.

15. A device for engaging an epitrochoidal surface which defines the cavity in the cylinder block of a rotary type engine, including rotatable base means having a first fixed axis of rotation and having a surface disposed normal to said axis for supporting an engine cylinder block with the center of the epitrochoidal surface thereof coincident with the axis of rotation of said base means, means rotatable about a second fixed axis spaced laterally from and parallel to said first fixed axis, work engaging means for engaging the epitrochoidal surface of a supported cylinder block, means supporting said work engaging means, means pivotally coupling said supporting means with said means rotatable about said second fixed axis and having an axis spaced laterally from and parallel to said second fixed axis, the axis of said pivotal coupling means having a predetermined location with respect to said work engaging means, the distance between said second fixed axis and the axis of said pivotal coupling means being equal to the maximum degree of orbital eccentricity of the epitrochoidal surface of a supported cylinder block, guide means providing a third fixed axis and cooperatively disposed with respect to said work engaging supporting means, the distance between the axes of said second and third fixed axes having a predetermined relation to the distance between said first and second fixed axes, means cooperating with said fixed guide means and said supporting means for maintaining said third fixed axis and the points of contact of said work engaging means with the epitrochoidal surface of a supported engine block in a common vertical plane which is normal to a line tangent to said epitrochoidal surface at each point of contact, means for imparting rotation in a given direction to said base means at a given speed, and means for simultaneously imparting movement to said rotatable means in such a manner as to assure accurate positioning of said work engaging means with respect to said epitrochoidal surface.

16. A device for engaging an epitrochoidal surface defining the cavity in the cylinder block of a rotary type engine as set forth in claim 15 wherein the distance between said first fixed axis and said second fixed axis is equal to the radius of a rotor adapted to be accommodated by said cavity measured from the center of the rotor to the points of engagement of said rotor with the epitrochoidal surface of a cylinder block supported by said base means.

17. A device for measuring the contour of an epitrochoidal surface which defines the cavity in the cylinder block of a rotary type engine, including rotatable base means having a first fixed axis of rotation and having a surface disposed normal to said axis for supporting an engine cylinder block with the center of the epitrochoidal surface thereof coincident with the axis of rotation of said base means, crank means rotatable about a second fixed axis parallel to and spaced laterally a predetermined distance from said first fixed axis, feeler means having a restricted surface area for detecting the contour of the epitrochoidal surface of a supported cylinder block, feeler means support means, means pivotally coupling said support means with said crank means at a point spaced laterally from said second fixed axis, the axis of said pivotal coupling means being coincident with the restricted detecting surface area of said feeler means, the distance between said second fixed axis and the axis of said pivotal coupling means being equal to the maximum degree of orbital eccentricity of the epitrochoidal surface of a supported cylinder block, guide means providing a third fixed axis and cooperatively disposed with respect to said support means, said first, second and third fixed axes being located in a common plane, the distance between said second and third fixed axes having a predetermined relation to the distance between said first and second fixed axes, means cooperating with said fixed guide means, and the means pivotally coupling the crank means and support means for maintaining said third fixed axis and the points of contact of said feeler means with the epitrochoidal surface of a supported engine block in a common plane which is normal to a line tangent to the epitrochoidal surface at each point of engagement therewith by said feeler means, means for imparting rotation in a given direction to said base means at a given speed, means for simultaneously imparting rotation to said crank means in the opposite direction at a predetermined speed of rotation greater than the speed of rotation of said base means, and indicator means coupled with said feeler means.

18. A device for measuring the contour of an epitrochoidal surface defining the cavity in the cylinder block of a rotary type engine as set forth in claim 17, wherein the predetermined distance between said first fixed axis and said second fixed axis is equal to the radius of a rotor adapted to be accommodated by said cavity measured from the center of said rotor to the points of engagement of said rotor with the epitrochoidal surface of a supported cylinder.

19. A device for measuring the contour of an epitrochoidal surface defining the cavity in the cylinder block of a rotary type engine as set forth in claim 17, wherein said feeler means includes a plurality of aligned feeler elements.

20. A device for measuring the contour of an epitrochoidal surface defining the cavity in the cylinder block of a rotary type engine as set forth in claim 17, wherein said support means includes a member having an elongate slot for accommodating said fixed guide means.

21. A device for measuring the contour of an epitrochoidal surface defining the cavity in the cylinder block of a rotary type engine as set forth in claim 17, wherein said feeler means includes an elongate member having longitudinally movable extremity for making restricted area contact with the epitrochoidal surface of a supported engine block.

* * * * *

UNITED STATES PATENT OFFICE
CERTIFICATE OF CORRECTION

Patent No. 3,863,353  Dated FEBRUARY 4, 1975

Inventor(s) OLIVER E. SAARI

It is certified that error appears in the above-identified patent and that said Letters Patent are hereby corrected as shown below:

Col. 4, line 9, "axix" should be --axis--
Col. 4, line 60, "member" should be --members--
Col. 6, line 16, "axix" should be --axis--
Col. 7, line 6, " four to six" should be --four or six--
Col. 7, line 62, "comprises" should be --comprise--

Signed and sealed this 24th day of June 1975.

(SEAL)
Attest:

RUTH C. MASON
Attesting Officer

C. MARSHALL DANN
Commissioner of Patents
and Trademarks